(No Model.)

C. S. BUSHNELL.
PROCESS OF PACKING ROOFING COMPOSITION.

No. 408,951. Patented Aug. 13, 1889.

Witnesses.

Cornelius S. Bushnell
Inventor
By atty.

UNITED STATES PATENT OFFICE.

CORNELIUS S. BUSHNELL, OF NEW HAVEN, CONNECTICUT, ASSIGNOR TO THE EVERLASTING ROOFING COMPANY, OF SAME PLACE.

PROCESS OF PACKING ROOFING COMPOSITION.

SPECIFICATION forming part of Letters Patent No. 408,951, dated August 13, 1889.

Application filed November 5, 1888. Serial No. 289,951. (No model.)

*To all whom it may concern:*

Be it known that I, CORNELIUS S. BUSHNELL, of New Haven, in the county of New Haven and State of Connecticut, have invented a new Improvement in Methods of Packing Composition for Roofing and other Purposes; and I do hereby declare the following, when taken in connection with accompanying drawings, and the letters of reference marked thereon, to be a full, clear, and exact description of the same, and which said drawings constitute part of this specification, and represent, in—

Figure 1:
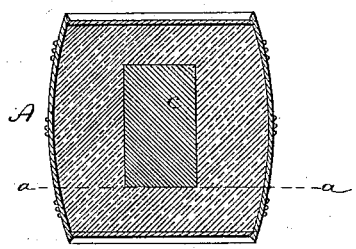
Figure 2:
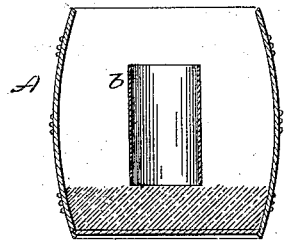

Figure 1, a vertical central section of a package complete; Fig. 2, a vertical section showing the jacket arranged to receive the heated ingredients with which the base is to be mixed.

This invention relates to an improvement in packing composition such as used for roofing and like purposes, so that it may be conveniently shipped and retained in bulk until required for use and then properly prepared for use.

The composition for roofing and like purposes is usually composed of a base—such, for illustration, as soapstone combined with numerous ingredients which, when in a melted condition, are mixed with the soapstone or base, whatever it may be. Hitherto the ingredients composing the composition have been procured here and there separately and shipped unmixed. The result of this is that the directions for the proper proportions and mixture of the ingredients are not uniformly followed, so that the composition made from the same formula in one place is, because of imperfect mixture, different from what will be found in another place. One of the principal ingredients of these compositions is coal-tar or some material of a similar character. If shipped by itself in a cask, as in the usual manner of shipping this material, a very large proportion is unavoidably wasted, because of adhering to the cask. Again, it is often inconvenient to prepare the ingredients for mixing with the base.

The object of my invention is to produce a package which shall contain the base as a mass separate from the other ingredients with which the base is to be mixed, the other ingredients mixed by themselves within the same package, and so that a person receiving the package cannot fail to properly mix the ingredients with the base, and so that a uniform quality of the composition will be produced at all points; and the invention consists in placing the base within a case or cask and introducing into the mass of the base a tubular jacket around which the base will pack, and so as to leave a space or chamber within the jacket, and then mixing and preparing the other ingredients of the composition together and while in a heated state pouring them into the chamber formed by the jacket within the base, and so that before the mixed ingredients have completely set the jacket may be removed, leaving the ingredients in a mass surrounded by the base, and so that when a package thus prepared reaches its destination the ingredients may be removed from the base, reheated, and mixed with the base.

In illustrating my invention I will describe it as with relation to the composition for which Letters Patent of the United States No. 389,050 were granted to me September 4, 1888. That composition consists of soapstone as the base mixed with the sediment which is derived from petroleum when standing in tanks, and which also adheres to the pump-rods in wells. This material is removed from the rods when they are drawn from the well and is removed from the tanks after the oil has been drawn off, and is commercially known as "B. S.," also as "rod-wax." To these ingredients resin is added, and also silicate of soda, in proper proportions to give the required hardness to the composition. It is necessary, or, at least, desirable, that the resin, B. S., and silicate of soda shall be thoroughly mixed before being combined with the soapstone. The proportion of the ingredients in this composition are substantially sixty parts of soapstone, twenty parts resin, fifteen parts B. S., and five parts silicate of soda.

In preparing the composition for market it is best placed in a cask, as seen in the drawings, A representing the cask. Into this cask the base or soapstone is introduced, say, up to the line *a*. Then a tubular cylinder or jacket *b* is introduced, resting on the soapstone, and then the space between the cylinder and the cask is packed with soapstone, so as to leave a chamber c within the body of the cask and surrounded by soapstone.

The ingredients with which the base is to be mixed for application having been prepared in the usual manner, and while in a heated condition, are poured into the chamber c, and as soon as the heated ingredients have set around the outside or become partially cooled the jacket b is withdrawn, leaving the ingredients inclosed by the wall formed by the base. The jacket is best made from thin sheet metal, so as to be conveniently handled, and is of a size corresponding to the quantity of the mixed ingredients to be placed therein. The jacket removed, the remainder of the base necessary to complete the composition is then added and the cask closed. It is then ready for shipment.

When required for use, the ingredients are readily removed in a hard mass from the base, and, reheated, are brought to their semi-fluid condition and then mixed with the base in the usual manner.

The jacket is introduced into the base to form a chamber, within which the ingredients may be introduced without mixing with the base, so that they remain there as secure as if in an independent package. This method of shipment insures the proper proportion of the ingredients, so that no mistake can be made by the introduction of too much or too little of any ingredient. The composition being a standard at the place of packing, the composition will be up to that standard wherever it is applied.

The description which I have made of the package as applied to my particular compound will be sufficient to enable those skilled in the manufacture of such compositions to pack the ingredients under their formulas, and so that the single package will contain all the ingredients necessary to produce a quantity of composition corresponding to the contents of the package.

I have particularly mentioned the composition as for roofing purposes; but it will be understood that this method of packing and the composition itself are applicable to various purposes.

I am aware that, broadly considered, a package composed of a base or body with ingredients for mixing therewith inclosed within said body have heretofore been made; but I am not aware that packages of ingredients for composition have been made by forming a chamber within the base material, into which the ingredients to be mixed therewith are placed, the said base itself forming the walls of the chamber to contain the said ingredients, which is the essential feature of this invention.

I claim—

The herein-described method of packing composition for roofing and other purposes for shipment, which consists in placing the base material in the shipping-case, introducing therein a tubular jacket to form a chamber surrounded by said base material, then pouring the ingredients with which the base is to be mixed into said chamber while heated and in a semi-liquid condition, then, before the ingredients have completely set, removing the jacket, leaving the said ingredients in the chamber, the walls of which are the base material with which the ingredients are to be mixed, substantially as described.

CORNELIUS S. BUSHNELL.

Witnesses:
JOHN E. EARLE,
FRED C. EARLE.